United States Patent [19]

Schläfer et al.

[11] Patent Number: 5,250,670

[45] Date of Patent: Oct. 5, 1993

[54] WATER-SOLUBLE MONOAZO COMPOUNDS CONTAINING FIBER-REACTIVE GROUPS OF VINYL SULFONE SERIES AS WELL AS TRIAZINYL RADICAL, AND PROCESS FOR DYEING WITH SAME

[75] Inventors: Ludwig Schläfer, Kelkheim; Werner H. Russ, Flörsheim am Main, both of Fed. Rep. of Germany

[73] Assignee: Hoechst Aktiengesellschaft, Frankfurt am Main, Fed. Rep. of Germany

[21] Appl. No.: 950,930

[22] Filed: Sep. 24, 1992

[30] Foreign Application Priority Data

Sep. 27, 1991 [DE] Fed. Rep. of Germany ....... 4132223

[51] Int. Cl.$^5$ .................. C09B 62/51; D06P 1/384
[52] U.S. Cl. ............................ 534/642; 534/638; 8/549; 8/449; 8/457
[58] Field of Search ............. 534/642, 632, 638

[56] References Cited

U.S. PATENT DOCUMENTS 5,037,965 8/1991 Morimitsu et al. ............. 534/642 X
5,104,978 4/1992 Akahori et al. ..................... 534/642

FOREIGN PATENT DOCUMENTS 0174275 3/1986 European Pat. Off. .
0384372 8/1990 European Pat. Off. .
45-10789 4/1970 Japan .
55-39672 10/1980 Japan .
3-72572 3/1991 Japan ................................. 534/642
4-108867 4/1992 Japan ................................. 534/642

OTHER PUBLICATIONS

Miki et al, Chemical Abstracts, vol. 115, No. 73621f (1991).

Washimi et al, Chemical Abstracts, vol. 117, No. 152727q (1992).

*Primary Examiner*—Mary C. Lee
*Assistant Examiner*—Fiona T. Powers

[57] ABSTRACT

Water-soluble azo compounds, a process for their preparation and their use as dyes. There are described monoazo compounds which exhibit fiber-reactive properties and dye hydroxy- and/or carboxamido-containing materials, in particular fiber materials, such as, for example, cellulose fiber materials and wool, in shades of high color strength and good fastness properties and can also be used in particular for resist and discharge printing. They have the formula (1)

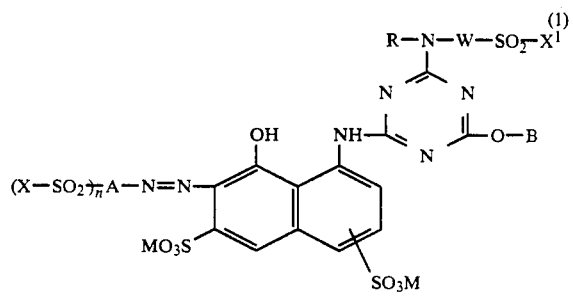

in which:
A is substituted or unsubstituted phenylene or unsubstituted or sulfo-substituted naphthylene, the groups $X-SO_2-$ and $-SO_2X^1$ are fiber-reactive groups from the vinylsulfonyl series, n is the number 1 or 2, M is hydrogen or an alkali metal, R is hydrogen or a lower alkyl, W is phenylene or lower alkylene, B is lower alkyl and one group $-SO_3M$ is bound to the 8-naphthol radical in the 3- or 4-position.

17 Claims, No Drawings

WATER-SOLUBLE MONOAZO COMPOUNDS CONTAINING FIBER-REACTIVE GROUPS OF VINYL SULFONE SERIES AS WELL AS TRIAZINYL RADICAL, AND PROCESS FOR DYEING WITH SAME

The invention is in the technical field of fiber-reactive azo dyes.

Individual azo dyes containing an aminonaphtholsulfonic acid coupling component, a fiber-reactive group from the vinylsulfonyl series and moreover an alkoxy-substituted s-triazine radical, are disclosed in the published, examined Japanese Patent Applications having the publication Nos. Sho-45/10,789 and Sho-55/39,672 and in the European Patent Applications Publication Nos. 0,174,275A and 0,384,372A.

The present invention, then, provides novel valuable fiber-reactive monoazo compounds which produce dyeings having good to very good wet fastness properties and which are highly suitable for discharge and resist printing and can thus be used in a wider range of applications for the dyeing of fiber material. In discharge printing, a colored fabric web (ground) is printed with a discharge agent in a desired pattern; the discharge agent destroys the dye provided that the latter is dischargeable, resulting in a white pattern on the dyeing (discharge to white) after completion of the discharge process. If the discharge on the printed fabric additionally contains a discharge-resistant dye, a printing pattern in a different shade (colored discharge) is obtained after completion of the discharge process and a customary treatment to fix this added dye on the ground. In resist printing, the fabric is first printed in a desired pattern using a suitable resist agent. The fabric thus pre-printed is then cross-dyed (over-padded or over-printed) with a dye which is capable of combining with the resist agent and can thus no longer be fixed on the fabric, as a result of which no dye is fixed on the resist areas and thus the dyeing obtained has a white pattern corresponding to the pattern of the resist agent.

The novel monoazo compounds according to the invention have the formula (1)

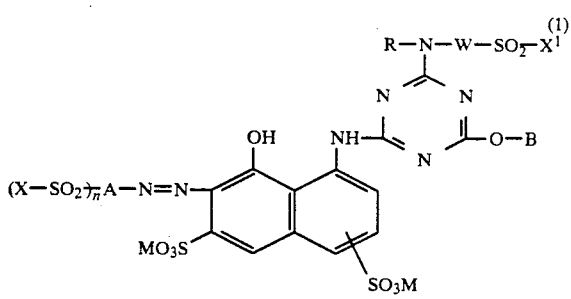

in which:

A is phenylene which may be substituted by 1 or 2 substituents, such as, for example, substituents from the group comprising halogen, such as bromine and in particular chlorine, alkyl of 1 to 4 carbon atoms, such as ethyl and in particular methyl, alkoxy of 1 to 4 carbon atoms, such as ethoxy and in particular methoxy, sulfo and carboxy, the phenylene radical being preferably the meta- or para-phenylene radical, or is an unsubstituted or sulfo-substituted naphthylene to which the azo group is preferably bound in the 2-position;

X is vinyl, or is ethyl substituted by a substituent which can be eliminated by alkali with the formation of a vinyl group, preferably β-sulfatoethyl;

n is the number 1 or 2, preferably 1;

M is hydrogen or an alkali metal, such as sodium, potassium or lithium;

R is hydrogen or alkyl or 1 to 4 carbon atoms, such as ethyl and in particular methyl, particularly preferably hydrogen;

W is phenylene or alkylene of 2 to 4 carbon atoms, preferably 1,3-phenylene, 1,4-phenylene, 1,2-ethylene and 1,3-propylene;

$X^1$ is vinyl, or is ethyl substituted in the β-position by a substituent which can be eliminated by alkali with the formation of a vinyl group, such as preferably β-chloroethyl or β-sulfatoethyl, and is preferably vinyl or β-sulfatoethyl;

B is alkyl of 1 to 4 carbon atoms, such as ethyl and in particular methyl;

one sulfo group —$SO_3M$ is bound to the 8-naphthol radical in the 3- to 4-position.

Of these, further preference is given to compounds in which A is a radical of the formula (2a) or (2b)

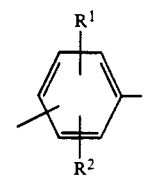

(2a)

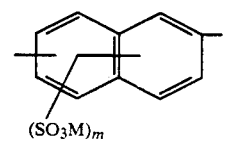

(2b)

in which:

$R^1$ is hydrogen, alkyl of 1 to 4 carbon atoms, such as ethyl and in particular methyl, alkoxy of 1 to 4 carbon atoms, such as ethoxy and in particular methoxy, carboxy, chlorine or sulfo, preferably hydrogen or methoxy;

$R^2$ is hydrogen, alkyl of 1 to 4 carbon atoms, such as ethyl and in particular methyl, alkoxy of 1 to 4 carbon atoms, such as ethoxy and in particular methoxy, or chlorine, preferably hydrogen or methoxy;

m is the number zero or 1, the group $SO_3M$ being preferably bound in the 1-, 6- or 8-position if m is 1 (in the case where m is zero, this grouping is a hydrogen atom);

the group X—$SO_2$— in the formula radical (2b) is preferably in the 6- or 8-position of the naphthyl radical bonded to the azo group in the 2-position.

Examples of substituents in the β-position of the ethyl group of X and $X^1$ which can be eliminated by alkali are alkanoyloxy of 2 to 5 carbon atoms, such as acetyloxy, benzoyloxy, sulfobenzoyloxy, toluenesulfonyloxy, halogen, such as bromine and in particular chlorine, dimethylamino, diethylamino, phosphato, thiosulfato and sulfato.

The groups "sulfo", "carboxy", "phosphato", "thiosulfato" and "sulfato" include not only their acid form but also their salt form. Accordingly, sulfo groups are groups of the formula —SO$_3$M, carboxy groups those of the formula —COOM, phosphato groups those of the formula —OPO$_3$M$_2$, thiosulfato groups those of the formula —S—SO$_3$M and sulfato groups those of the formula —OSO$_3$M, where M has in each case the abovementioned meaning.

Examples of radicals of the formula (X—SO$_2$)$_n$—A— in the compounds of the formula (1) are 4-(β-sulfatoethylsulfonyl)phenyl, 4-vinylsulfonylphenyl, 3-(β-sulfatoethylsulfonyl)phenyl, 2,4-bis(β-sulfatoethylsulfonyl)phenyl-2,5-bis(β-sulfatoethylsulfonyl)phenyl, 3,4-bis(β-sulfatoethylsulfonyl)phenyl, 3,5-bis(β-sulfatoethylsulfonyl)phenyl, 2-methoxy-5-(β-sulfatoethylsulfonyl)phenyl, 4-methoxy-3-(β-sulfatoethylsulfonyl)phenyl, 2-methoxy-4-(β-sulfatoethylsulfonyl)phenyl, 2-methoxy-5-methyl-4-(β-sulfatoethylsulfonyl)phenyl, 2,5-dimethoxy-4-(β-sulfatoethylsulfonyl)phenyl, 6-(β-sulfatoethylsulfonyl)-2-naphthyl, 8-(β-sulfatoethylsulfonyl)-2-naphthyl, 6-sulfo-8-(β-sulfatoethylsulfonyl)-2-naphthyl, 8-sulfo-6-(β-sulfatoethylsulfonyl)-2-naphthyl and 1-sulfo-6-β-sulfatoethylsulfonyl)- 2-naphthyl.

Examples of radicals of the formula —W—SO$_2$—X$^1$ in the compounds of the formula (1) are 4-(β-sulfatoethylsulfonyl)phenyl, 3-(β-sulfatoethylsulfonyl)phenyl, 4-vinylsulfonylphenyl, 3-vinylsulfonylphenyl, 2-(β-sulfatoethylsulfonyl)ethyl, 2-(β-chloroethylsulfonyl)ethyl, 2-(vinylsulfonyl)ethyl, 3-(vinylsulfonyl)propyl, 3-(β-chloroethylsulfonyl)propyl, 3-(β-sulfatoethylsulfonyl)propyl, 4-(β-sulfatoethylsulfonyl)butyl, 4-(β-chloroethylsulfonyl)butyl and 4-(vinylsulfonyl)butyl.

The present invention furthermore relates to processes for the preparation of the azo compounds according to the invention of the formula (1), which comprise coupling a diazonium salt compound of an aromatic amine of the formula (3)

(3)

in which X, n and A have one of the abovementioned meanings, with a compound of the formula (4)

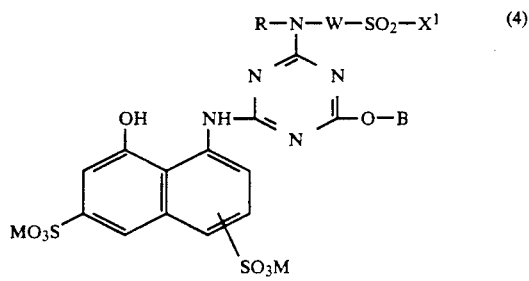

(4)

in which M, B, R, W and X$^1$ have the abovementioned meanings and the group —SO$_3$M is bound to the 8-naphthol radical in the 3- or 4-position, or reacting a compound of the formula (5)

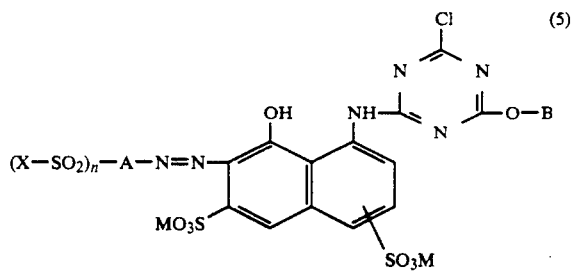

(5)

in which X, n, A, M and B have one of the abovementioned meanings and the group —SO$_3$M is bound to the 8-naphthol radical in the 3- or 4-position, with an amino compound of the formula (6)

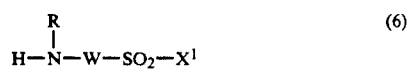

(6)

in which R, W and X$^1$ have one of the abovementioned meanings.

The compounds of the formula (3) have been described in the literature in large numbers as has their conversion into diazonium compounds by the customary diazotization reactions, such as, for example, at −5° C. to +15° C. by means of nitrous acid at a pH of less than 2.5. The coupling reaction is preferably carried out in aqueous solution analogously to known procedures, such as, for example, at a pH of between 3 and 8, preferably between 4 and 7, and at a temperature of between 0° and 40° C., preferably between 10° and 25° C.

Likewise, the reaction of the chlorotriazinylamino compound of the formula (5) with the amino compound of the formula (6) is carried out by the well known processes of reacting a chlorotriazine with an amino compound, for example in aqueous or aqueous-organic medium, preferably in aqueous solution, at a pH of between 1 and 8, preferably between 2 and 7, particularly preferably between 3 and 4.5, and at a temperature of between 0° and 90° C., preferably between 20 and 70° C. If the reaction is carried out in an aqueous-organic medium, in which the organic medium is a solvent which is inert towards the reactants and preferably miscible with water, the organic solvent is, for example, toluene or preferably acetone or N-methylpyrrolidone.

The 2,4-dichloro-4-alkoxy-s-triazine compound which can serve to prepare the starting compounds (4) and (5) and its preparation are disclosed, for example, in Russian Patent No. 295,786.

Examples of starting compounds of the formula (3) are 4-(β-sulfatoethylsulfonyl)aniline, 4-vinylsulfonylaniline, 3-(β-sulfatoethylsulfonyl)aniline, 2,4-bis(β- (β-sulfatoethylsulfonyl)aniline, 2,5-bis(β-sulfatoethylsulfonyl)aniline, 3,4-bis(β-sulfatoethylsulfonyl)aniline, 3,5-bis(β-sulfatoethylsulfonyl)aniline, 2-methoxy-5-(β-sulfatoethylsulfonyl)aniline, 4-methoxy-3-(β-sulfatoethylsulfonyl)aniline, 2-methoxy-4-(β-sulfatoethylsulfonyl)aniline, 2-methoxy-5-methyl-4-(β-sulfatoethylsulfonyl)aniline, 6-(β-sulfatoethylsulfonyl)-2-aminonaphthalene, 8-(β-sulfatoethylsulfonyl)-2-aminonaphthalene, 6-sulfo-8-(β-sulfatoethylsulfonyl)-2-aminonaphthalene, 8-sulfo-6-(β-sulfatoethylsulfonyl)-2-amino naphthalene and 1-sulfo-6-(β-sulfatoethylsulfonyl)-2-aminonaphthalene.

Examples of amino compounds of the formula HN(R)—W—SO$_2$—X$^1$ are 4-($\beta$-sulfatoethylsulfonyl)aniline, 3-($\beta$-sulfatoethylsulfonyl)aniline, N-methyl-4-($\beta$-sulfatoethylsulfonyl)aniline, N-methyl-3-($\beta$-sulfatoethylsulfonyl)aniline, N-methyl-3-vinylsulfonylaniline, N-methyl-4-vinylsulfonylaniline, 4-vinylsulfonylaniline, 3-vinylsulfonylaniline, 2-($\beta$-sulfatoethylsulfonyl)-1-aminoethane, 2-($\beta$-chloroethylsulfonyl)-1-aminoethane, 2-vinylsulfonyl-1-aminoethane, 3-vinylsulfonyl-1-aminopropane, 3-($\beta$-chloroethylsulfonyl)-1-aminopropane, 3-($\beta$-sulfatoethylsulfonyl)-1-aminopropane, 4-($\beta$-sulfatoethylsulfonyl)-1-aminobutane, 4-($\beta$-chloroethylsulfonyl)-1-aminobutane and 4-vinylsulfonyl-1-aminobutane.

Separation of the compounds prepared according to the invention from the synthesis batches is carried out by generally known methods, such as, for example, by precipitation from the reaction medium by means of an electrolyte, such as, for example, sodium chloride and potassium chloride, or by evaporation or spray-drying of the reaction solution, it being possible to add a buffer substance to the reaction solution. The novel azo compounds according to the invention of the formula (1), hereinafter compounds (1), have fiber-reactive properties and have very good dye properties. Accordingly, they can be used for the dyeing of hydroxy and/or carboxamido-containing material, in particular fiber material, and also of leather. Likewise, the solutions obtained during synthesis of the compounds (1) can be used directly for dyeing as a liquid preparation, if appropriate after addition of a customary buffer substance capable of maintaining a pH of between 3 and 7, and, if appropriate, after concentration of the solution.

Accordingly, the present invention also relates to the use of the compounds (1) according to the invention for the dyeing (including printing) of hydroxy- and/or carboxamido-containing materials, in particular fiber materials, and to processes for applying them to these substrates. This can be done analogously to known procedures.

Hydroxy containing materials are those of natural or synthetic origin, such as, for example, cellulose fibers or their regenerated products and polyvinyl alcohols or cellulose-containing products, such as paper. Cellulose fiber materials are preferably cotton but also other vegetable fibers, such as linen, hemp, jute and ramie fibers; examples of regenerated cellulose fibers are staple viscose and filament viscose.

Examples of carboxamido-containing materials are synthetic and natural polyamides and polyurethanes not only in bulk form, such as, for example, sheets, but also in the form of fibers, for example wool and other animal hair, silk, leather, nylon-6,6, nylon-6, nylon-11 and nylon-4.

In accordance with the application according to the invention, the compounds (1) can be applied to the substrates mentioned and fixed thereon by the application methods known for water-soluble dyes, in particular fiber-reactive dyes, such as, for example, by applying the compound (1) to the substrate in dissolved form or incorporating it therein and fixing it thereon or therein, if appropriate by application of heat or by the action of an alkaline agent or by both measures. Such dyeing and fixation methods have been described in a large number not only in the technical literature but also in the patent literature, such as, for example, in European Patent Application Publication No. 0,218,131.

The compounds (1) according to the invention have good to very good solubility in water and good stability in printing pastes and dye baths. They are distinguished by high color strength and good color buildup and produce red dyeings and prints of high color strength in very high fixation yields, which are distinguished by good use and manufacturing fastness properties, such as, for example, fastness to washing, seawater, water, chlorinated water, acid, alkali, cross-dyeing, perspiration, waste gas, hot-pressing, pleating, decatizing, dry cleaning and rubbing. The light fastness properties of the dyeings and prints obtained are very good not only when dry but also when moistened with drinking water or with an acid or alkaline perspiration solution. Non-fixed dye portions can be readily washed off. Prints on cellulose fiber materials exhibit sharp contours on a clear white ground. In the unfixed state, the prints and dyeings do not mark off or bleed.

The compounds (1) according to the invention are suitable in particular for discharge and resist printing. Their usability in these two industrially important application processes is based on the fact that dyeings of these new compounds (1) are dischargeable to pure white and that the novel compounds (1) do not color the areas of cellulose fiber material which have been printed or impregnated with a resist agent, even under the customary fixation conditions for fiber-reactive dyes, i.e. in the presence of alkaline agents and higher temperatures, so that the compounds (1) according to the invention are suitable without problems for producing dyeings whose negative patterns are given by a resist agent.

The Examples which follow serve to illustrate the invention. Parts and percentages are by weight unless stated otherwise. Parts by weight relate to parts by volume as the kilogram relates to the liter.

The compounds described in these Examples by way of the formulae are given in the form of the free acids; in general, they are prepared and isolated in the form of their alkali metal salts, such as lithium salts, sodium salts or potassium salts, and used in the form of their salts for dyeing.

Likewise, the starting compounds and components given in the Examples which follow, in particular the Table Examples, in the form of the free acid can be used in the synthesis as such or in the form of their salts, preferably their alkali metal salts.

The absorption maxima ($\lambda_{max}$) in the visible range given for the compounds according to the invention were determined using their alkali metal salts in aqueous solution. In the Table Examples the $\lambda_{max}$ values are put in brackets to the hue given; the wavelength is in nm.

EXAMPLE 1

A solution of 41.1 parts of 6-($\beta$-sulfatoethylsulfonyl)-2-aminonaphthalene-1-sulfonic acid and 7 parts of sodium nitrite in 400 parts of water having a pH of 5 to 6 is slowly added to a mixture of 150 parts of ice and 30 parts by volume of conc. aqueous hydrochloric acid, stirring at 0° to 5° C. is continued for another hour, and excess nitrous acid is destroyed in the usual manner by means of sulfamic acid. A neutral solution of 47 parts of 1-(2,-chloro-4'-methoxy-s-triazinyl)amino-8-naphthol-3,6-disulfonic acid in 550 parts of water is added, the pH of the coupling batch is brought to 4 to 5 by means of sodium bicarbonate, and the coupling reaction is completed within this pH range and at a temperature of between 15° and 20° C.

1000 parts of water and 28.1 parts of 3-(β-sulfatoethylsulfonyl)aniline are added to the solution of the starting compound thus obtained, which, written in the form of the free acid, has the formula (10) (for formula, see formula sheets following the last Example), and the mixture is brought to a pH of 4 with crystallized sodium acetate. The reaction batch is slowly heated to 70° C. over a period of one hour and stirred at this temperature for another three hours. To complete the reaction, the batch can then, if required, be heated to 100° C. for a short period. The reaction mixture is then clarified, and the filtrate is spray-dried.

This gives the azo compound according to the invention which, written in the form of the free acid, has the formula (11) (for formula, see formula sheets following the last Example) as an alkali metal salt in the form of a dark-red, electrolyte-containing powder. In aqueous solution, it has an absorption maximum at 543 nm. The azo compound according to the invention exhibits very good fiber-reactive dye properties and produces, by the application and fixation processes customary in industry for fiber-reactive dyes, bluish-red dyeings and prints of high color strength and good manufacturing and wear fastness properties on the materials mentioned in the description, in particular cellulose fiber materials. The dye is distinguished by a high degree of fixation and is highly suitable for discharge printing; dyeings obtained with this dye can be discharged to pure white. Furthermore, the dye is highly suitable for resist printing since areas of a dyeing pretreated with a resist agent are not fixed and thus, as desired, do not dye the material in these areas, resulting in dyeings exhibiting pure white patterns.

EXAMPLE 2

A suspension of 46.7 parts of 2-chloro-4-methoxy-6-(3'-β-sulfatoethylsulfonylphenyl)amino-s-triazine in 100 parts of water is added to a neutral solution of 31.9 parts of 1-amino-8-naphthol-3,6-disulfonic acid in 250 parts of water. The condensation reaction is carried out at a pH of 4 and a temperature of 80° C. An aqueous sulfuric acid suspension prepared in the usual manner (about 400 parts) of the diazonium salt of 28.1 parts of 4-(β-sulfatoethylsulfonyl)aniline is then added, and the coupling reaction is carried out at a pH of between 4 and 5 and a temperature of 15° to 20° C.

The resulting solution of the azo compound according to the invention which, written in the form of the free acid, has the formula (12) (for formula, see formula sheets following the last Example) is clarified and spray-dried, giving the azo compound according to the invention as the alkali metal salt (sodium salt) in the form of an electrolyte-containing black-red powder. It has an absorption maximum in the visible range at 522 nm, exhibits very good fiber-reactive dye properties and produces red dyeings and prints of high color strength and good fastness properties on the materials mentioned in the description, such as, in particular, cellulose fiber materials. The dye according to the invention can be readily used in discharge and resist printing processes.

EXAMPLE 3

27.2 parts of 3-(β-sulfatoethylsulfonyl)-1-aminopropane are added to an aqueous solution of 81.5 parts of the sodium salt of an azo starting compound obtained in the usual manner by a coupling reaction of diazotized 2,5-dimethoxy-4-(β-sulfatoethylsulfonyl)aniline with 1-(2'-chloro-4'-methoxy-s-triazin-6'-yl)amino-3,6-disulfonaphthol, the batch is first stirred at 10° to 20° C. at a pH of 7, and, after some time, the pH is slowly increased to 9. Stirring is continued for another hour, the batch is then brought to a pH of 4 with hydrochloric acid, clarified at 80° C. using activated carbon, filtered, and the resulting azo compound according to the invention which, written in the form of the free acid, has the formula (13) (for formula, see formula sheets following the last Example) is isolated by salting out with sodium chloride.

It has an absorption maximum in the visible range at 540 nm, exhibits very good fiber-reactive dye properties and produces red dyeings of high color strength and good fastness properties on, for example, cellulose fiber materials. The dye can not only be used without problems in customary dyeing and printing processes but is also highly suitable in discharge and resist printing.

EXAMPLES 4 to 36

In the Table Examples which follow, further compounds according to the invention of the formula (1) are described by means of their formula components. They can be prepared according to the invention, for example according to one of the above Examples, by means of their components apparent from the particular Table Example in combination with formula (1) (such as the diazo component of the formula (3), the 2,4-dichloro6-alkoxy-s-triazine, the 1-amino-8-naphthol-3,6- or -4,6-disulfonic acid and the amine of the formula (6)). They exhibit fiber-reactive dye properties and produce, by the application and fixation methods customary for fiber-reactive dyes, dyeings and prints of high color strength and good fastness properties in particular on cellulose fiber materials in the hue given in the particular table example for dyeings on cotton. Moreover, they are suitable in particular for discharge and resist printing.

| Ex. | Radical $(X-SO_2)_n-A-$ | Position of the group $-SO_3M$ | Radical $-O-B$ | Radical $-N(R)-W-SO_2-X^1$ | Hue |
|---|---|---|---|---|---|
| 4 | 4-(β-Sulfatoethyl-sulfonyl)phenyl | 3- | ethoxy | 4-(β-sulfatoethyl-sulfonyl)phenylamino | red (510) |
| 5 | 4-(β-Sulfatoethyl-sulfonyl)phenyl | 4- | methoxy | 4-(β-sulfatoethyl-sulfonyl)phenylamino | red |
| 6 | 4-(β-Sulfatoethyl-sulfonyl)phenyl | 3- | methoxy | 2-(β-sulfatoethyl-sulfonyl)ethylamino | red (504) |
| 7 | 4-(β-Sulfatoethyl-sulfonyl)phenyl | 3- | methoxy | 2-(vinylsulfonyl)-ethylamino | red (504) |
| 8 | 3-(β-Sulfatoethyl-sulfonyl)phenyl | 3- | methoxy | 2-(vinylsulfonyl)-ethylamino | red |
| 9 | 3-(β-Sulfatoethyl-sulfonyl)phenyl | 3- | methoxy | 4-(β-sulfatoethyl-sulfonyl)phenylamino | red (505) |
| 10 | 3-(β-Sulfatoethyl-sulfonyl)phenyl | 3- | methoxy | 3-(β-sulfatoethyl-sulfonyl)phenylamino | red (506) |

-continued

| Ex. | Radical (X—SO$_2$)$_n$—A— | Position of the group —SO$_3$M | Radical —O—B | Radical —N(R)—W—SO$_2$—X$^1$ | Hue |
|---|---|---|---|---|---|
| 11 | 3-(β-Sulfatoethyl-sulfonyl)phenyl | 3- | methoxy | 2-(vinylsulfonyl)-ethylamino | red (500) |
| 12 | 3-(β-Sulfatoethyl-sulfonyl)phenyl | 3- | methoxy | 3-(vinylsulfonyl)-propylamino | red (502) |
| 13 | 3-(β-Sulfatoethyl-sulfonyl)phenyl | 4- | methoxy | 3-(β-sulfatoethyl-sulfonyl)propylamino | bluish red |
| 14 | 2-Methoxy-5-(β-sulfatoethyl-sulfonyl)phenyl-amino | 3- | ethoxy | 3-(β-sulfatoethyl-sulfonyl)phenylamino | bluish red (515) |
| 15 | 2-Methoxy-5-(β-sulfatoethyl-sulfonyl)phenyl-amino | 3- | methoxy | 3-(β-sulfatoethyl-sulfonyl)phenylamino | bluish red (515) |
| 16 | 2,5-Dimethoxy-4-(β-sulfatoethyl-sulfonyl)phenyl | 3- | methoxy | 3-(β-sulfatoethyl-sulfonyl)phenylamino | reddish violet (538) |
| 17 | 4-Methoxy-(3-β-sulfatoethyl-sulfonyl)phenyl | 3- | methoxy | 4-(β-sulfatoethyl-sulfonyl)phenyl-amino | bluish red |
| 18 | 2-Methoxy-5-methyl-4-(β-sulfatoethyl-sulfonyl)phenyl | 3- | methoxy | 4-β-sulfatoethyl-sulfonyl)phenyl-amino | bluish red |
| 19 | 2-Methoxy-5-methyl-4-(β-sulfatoethyl-sulfonyl)phenyl | 4- | methoxy | 4-β-sulfatoethyl-sulfonyl)phenyl-amino | red |
| 20 | 2-Methoxy-5-methyl-4-(β-sulfatoethyl-sulfonyl)phenyl | 3- | methoxy | 3-(β-sulfatoethyl-sulfonyl)propyl-amino | bluish |
| 21 | 2-Methoxy-5-methyl-4-(β-sulfatoethyl-sulfonyl)phenyl | 3- | ethoxy | 3-(β-sulfatoethyl-sulfonyl)propyl-amino | bluish red |
| 22 | 2-Methoxy-5-methyl-4-(β-sulfatoethyl-sulfonyl)phenyl | 3- | isopropoxy | 3-(vinylsulfonyl)-propylamino | bluish red |
| 23 | 1-Sulfo-6-(β-sulfatoethylsulfonyl)-naphth-2-yl | 3- | methoxy | 3-(vinylsulfonyl)-propylamino | bluish red |
| 24 | 1-Sulfo-6-(β-sulfatoethylsulfonyl)-naphth-2-yl | 3- | methoxy | 4-(vinylsulfonyl)-phenylamino | bluish red (532) |
| 25 | 6-Sulfo-8-(β-sulfatoethylsulfonyl)-naphth-2-yl | 3- | methoxy | 3-(β-sulfatoethyl-sulfonyl)phenylamino | bluish red (535) |
| 26 | 6-Sulfo-8-(β-sulfatoethylsulfonyl)-naphth-2-yl | 4- | methoxy | 3-(β-sulfatoethyl-sulfonyl)phenylamino | red |
| 27 | 8-Sulfo-6-(β-sulfatoethylsulfonyl)-naphth-2-yl | 3- | methoxy | 3-(β-sulfatoethyl-sulfonyl)phenylamino | bluish red (532) |
| 28 | 6-(β-Sulfatoethyl-sulfonyl)naphth-2-yl | 3- | methoxy | 3-(β-sulfatoethyl-sulfonyl)phenylamino | bluish red |
| 29 | 5-(β-Sulfatoethylsulfonyl)naphth-2-yl | 2- | methoxy | 3-(β-sulfatoethyl-sulfonyl)phenylamino | bluish red |
| 30 | 8-(β-Sulfatoethylsulfonyl)naphth-2-yl | 3- | methoxy | 3-(β-sulfatoethyl-sulfonyl)phenylamino | red (532) |
| 31 | 3,4-Bis(β-sulfatoethylsulfonyl)phenyl | 3- | methoxy | 3-(β-sulfatoethyl-sulfonyl)phenylamino | bluish red |
| 32 | 3,5-Bis(β-sulfatoethylsulfonyl)phenyl | 3- | methoxy | 3-(β-sulfatoethyl-sulfonyl)phenylamino | red |
| 33 | 3,5-Bis(β-sulfatoethylsulfonyl)phenyl | 4- | methoxy | 4-(β-sulfatoethyl-sulfonyl)phenylamino | bluish red |
| 34 | 3,5-Bis(β-sulfatoethylsulfonyl)phenyl | 3- | methoxy | 4-(β-sulfatoethyl-sulfonyl)phenylamino | red |
| 35 | 2-Sulfo-4-(β-sulfatoethylsulfonyl)phenyl | 3- | n-propoxy | 4-(β-sulfatoethyl-sulfonyl)phenylamino | red |
| 36 | 4-(β-Sulfatoethyl-sulfonyl)phenyl | 3- | methoxy | N-methyl-4-(β-sulfato-ethylsulfonyl)phenylamino | red (512) |

-continued
| Ex. | Radical $(X-SO_2)_n-A-$ | Position of the group $-SO_3M$ | Radical $-O-B$ | Radical $-N(R)-W-SO_2-X^1$ | Hue |
|---|---|---|---|---|---|
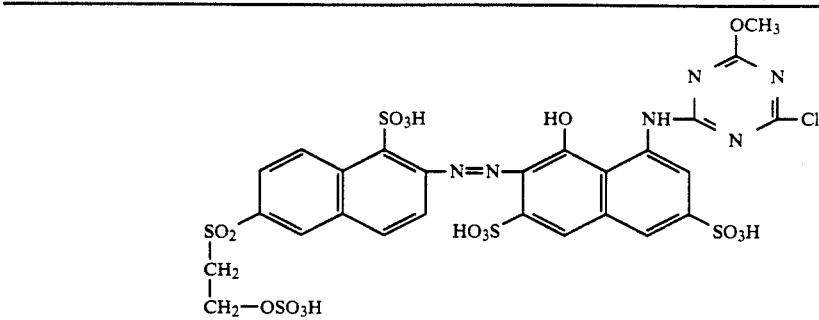
(10)
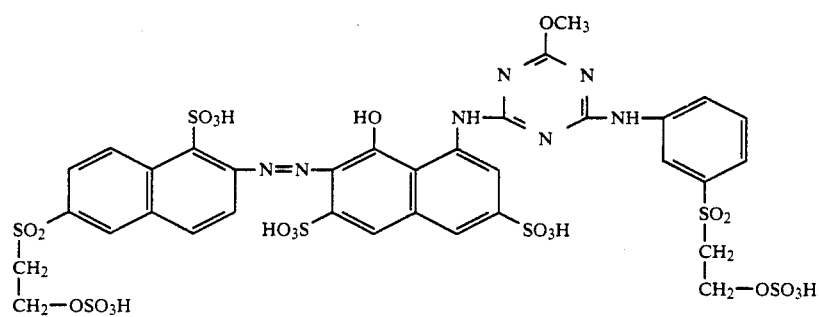
(11)
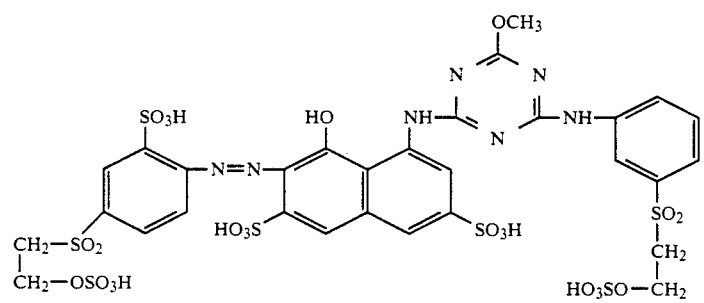
(12)
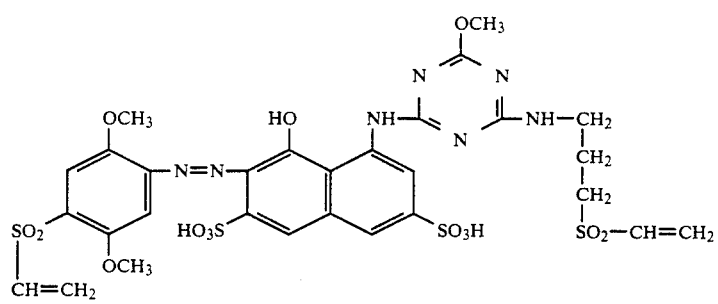
(13)
What is claimed is:
1. A monoazo compound of the formula

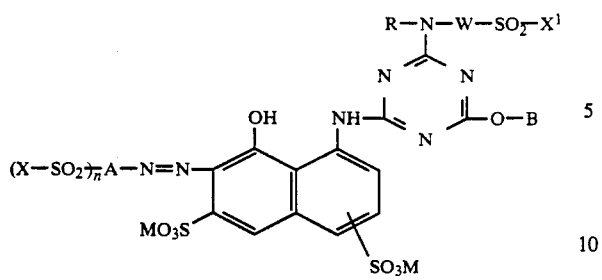

in which
- A is phenylene unsubstituted or substituted by 1 to 2 substituents, or is naphthylene unsubstituted or substituted by sulfo;
- X is vinyl, or is ethyl substituted by a substituent which is eliminated by alkali with formation of the vinyl group;
- n is the number 1 or 2;
- M is hydrogen or an alkali metal;
- R is hydrogen or alkyl or 1 to 4 carbon atoms;
- W is alkylene of 2 to 4 carbon atoms;
- $X^1$ is vinyl, or is ethyl substituted by a substituent which is eliminated by alkali with formation of a vinyl group;
- B is alkyl of 1 to 4 carbon atoms;
- the group —$SO_3M$ bound to the 8-naphthol moiety, is bound in the 3- or 4-position.

2. A compound as claimed in claim 1, wherein A is a group of the formula

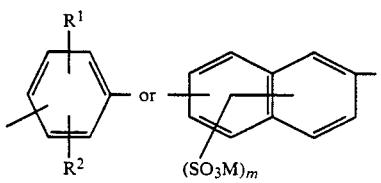

in which
- $R^1$ is hydrogen, alkyl of 1 to 4 carbon atoms, alkoxy of 1 to 4 carbon atoms, carboxy, chlorine or sulfo,
- $R^2$ is hydrogen, alkyl of 1 to 4 carbon atoms, alkoxy of 1 to 4 carbon atoms or chlorine, and m is the number zero or 1 (this grouping being hydrogen if m is zero).

3. A compound as claimed in claim 2, wherein A is meta- or para-phenylene of the formula

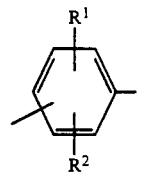

in which $R^1$ is hydrogen or methoxy and $R^2$ is hydrogen or methoxy.

4. A compound as claimed in claim 1, wherein X is β-sulfatoethyl.

5. A compound as claimed in claim 1, wherein $X^1$ is vinyl, β-chloroethyl or β-sulfatoethyl.

6. A compound as claimed in claim 1, wherein B is methyl.

7. A compound as claimed in claim 1, wherein W is 1,2-ethylene or 1,3-propylene.

8. A compound as claimed in claim 1, wherein n is 1.

9. A compound as claimed in claim 1, wherein R is hydrogen.

10. A compound as claimed in claim 2, wherein X is β-sulfatoethyl.

11. A compound as claimed in claim 2, wherein $X^1$ is vinyl, β-chloroethyl or β-sulfatoethyl.

12. A compound as claimed in claim 2, wherein B is methyl.

13. A compound as claimed in claim 2, wherein W is 1,2-ethylene or 1,3-propylene.

14. A compound as claimed in claim 2, wherein n is 1.

15. A compound as claimed in claim 2, wherein R is hydrogen.

16. In a process for dyeing a hydroxy- and/or carboxamide-containing material, in which a dye is applied to the material or incorporated in the material and is fixed on or in the material by means of heat or by means of an alkaline agent or by both measures, the improvement which comprises applying as a dye a monoazo compound of claim 1.

17. A process according to claim 16, wherein the material to be dyed is a fibre-material.

* * * * *